(12) United States Patent
Vasileiadis et al.

(10) Patent No.: US 12,406,288 B2
(45) Date of Patent: Sep. 2, 2025

(54) DIGITAL ARTIFACT MARKETPLACE

(71) Applicant: International Business Machines Corporation, Armonk, NY (US)

(72) Inventors: Vasileios Vasileiadis, Dublin (IE); Srikumar Venugopal, Dublin (IE); Stefano Braghin, Dublin (IE); Christian Pinto, Dublin (IE); Michael Johnston, Dublin (IE); Yiannis Gkoufas, East Wall (IE)

(73) Assignee: International Business Machines Corporation, Armonk, NY (US)

( * ) Notice: Subject to any disclaimer, the term of this patent is extended or adjusted under 35 U.S.C. 154(b) by 650 days.

(21) Appl. No.: 17/656,233

(22) Filed: Mar. 24, 2022

(65) Prior Publication Data
US 2023/0306481 A1 Sep. 28, 2023

(51) Int. Cl.
| | | |
|---|---|---|
| G06Q 30/00 | (2023.01) | |
| G06Q 20/12 | (2012.01) | |
| G06Q 30/018 | (2023.01) | |
| G06Q 30/02 | (2023.01) | |
| G06Q 30/0601 | (2023.01) | |

(52) U.S. Cl.
CPC ..... *G06Q 30/0603* (2013.01); *G06Q 20/1235* (2013.01); *G06Q 30/018* (2013.01); *G06Q 30/02* (2013.01)

(58) Field of Classification Search
CPC .................................................. G06Q 30/06
See application file for complete search history.

(56) References Cited

U.S. PATENT DOCUMENTS

| | | | |
|---|---|---|---|
| 7,653,552 B2 | 1/2010 | Vaidyanathan | |
| 8,560,403 B2* | 10/2013 | Adstedt | G06Q 30/0641 |
| | | | 705/26.1 |
| 8,752,002 B2* | 6/2014 | Banavar | G06Q 10/06393 |
| | | | 717/104 |
| 9,467,724 B2 | 10/2016 | Patterson | |

(Continued)

FOREIGN PATENT DOCUMENTS

EP 2378415 B1 7/2015

OTHER PUBLICATIONS

Batista, Danielle, et al. "Blockchains and provenance: How a technical system for tracing origins, ownership and authenticity can transform social trust." Building decentralized trust: multidisciplinary perspectives on the design of blockchains and distributed ledgers (2021): 111-128.*

(Continued)

*Primary Examiner* — Kathleen Palavecino
(74) *Attorney, Agent, or Firm* — Kelsey M. Skodje

(57) ABSTRACT

In an approach for storage, search, acquisition, and composition of a digital artifact, a processor obtains the digital artifact in a digital marketplace platform. The digital artifact is a collection of digital data with automatically generated and verifiable provenance and usage data. A processor transforms the digital artifact to define an access privilege. A processor shares the digital artifact in the digital marketplace platform by providing a view of a catalogue including the digital artifact. A processor authorizes a usage request based on the access privilege. A processor rewards a source of the digital artifact based on the usage of the digital artifact.

20 Claims, 5 Drawing Sheets

(56) References Cited

U.S. PATENT DOCUMENTS

| | | | |
|---|---|---|---|
| 9,990,195 | B2 | 6/2018 | Chou |
| 10,339,577 | B1 | 7/2019 | Stickle |
| 10,693,989 | B2 | 6/2020 | Eberlein |
| 10,755,331 | B2 | 8/2020 | Zappacosta |
| 11,700,123 | B2 * | 7/2023 | Withrow ............... G06Q 40/00 726/29 |
| 2008/0288471 | A1 | 11/2008 | Wu et al. |
| 2009/0028471 | A1 | 1/2009 | Tan |
| 2009/0192941 | A1 | 7/2009 | Fournier |
| 2014/0337325 | A1 * | 11/2014 | Glimcher ............ G06F 16/958 707/783 |
| 2016/0321629 | A1 * | 11/2016 | McCoy ............... H04L 9/3239 |
| 2017/0053295 | A1 | 2/2017 | Tiell |
| 2018/0341631 | A1 * | 11/2018 | Verma ................. G06F 40/30 |
| 2019/0171620 | A1 | 6/2019 | McCollum |
| 2019/0179689 | A1 | 6/2019 | Karanan |
| 2020/0058023 | A1 | 2/2020 | Travizano |
| 2021/0216612 | A1 * | 7/2021 | Wojcik ............... H04L 9/3247 |
| 2021/0365526 | A1 * | 11/2021 | Sachson ............... G06F 21/10 |
| 2022/0291964 | A1 | 9/2022 | Vasileiadis et al. |
| 2023/0224166 | A1 * | 7/2023 | Rector ................. G06F 21/16 705/59 |

OTHER PUBLICATIONS

Aubuchon et al. "Expediting digital workflow with openstack", Openstack Cloud Software, 2015, 11 pages, <www.openstack.org>.

Ezhilchelvan, Morgan G., "A Dependable Distributed Auction System: Architecture and an Implementation Framework", Proceedings of the 5th International Symposium on Autonomous Decentralized Systems (ISADS), Mar. 26-28, 2001, Dallas, Texas, 8 pages.

Hagleitner et al., "Heterogeneous Computing Systems for Complex Scientific Discovery Workflows", Proceedings of the 2021 Design, Automation & Test in Europe Conference & Exhibition (Date), Feb. 1-5, 2021, Virtual Conference, 6 pages.

Horsch et al. "OSMO: Ontology for simulation, modelling, and optimization", Proceedings of the 12th International Conference on Formal Ontology in Information Systems, Sep. 13-17, 2021, Bolzano, Italy, 6 pages.

Kirrane et al., "BlockConfess: Towards an Architecture for Blockchain Constraints and Forensics." Proceedings of the 2020 IEEE International Conference on Blockchain (Blockchain), May 3-6, 2020, Toronto, Canada, 6 pages.

Vassilliadis et al., "A walk in the graph: Fast and transparent generation of high-fidelity cache keys for workflow memoization", Proceedings of the 36th IEEE International Parallel &Distributed Processing Symposium, May 30-Jun. 3, 2022, 11 pages. [Under Review].

Whitt, Richard S., "Through a glass, darkly: Technical, policy, and financial actions to avert the coming digital dark ages." Santa Clara University, School of Law, Santa Clara High Technical Law Journal, vol. 33, Issue 2, Article 1, Jan. 1, 2017, 114 pages.

Agarwal, et al., A Marketplace for Data: An Algorithmic Solution, In Proceedings of the 2019 ACM Conference on Economics and Computation, May 12, 2019, 27 pages.

Chen, et al., Towards Model-based Pricing for Machine Learning in a Data Marketplace, In Proceedings of the 2019 International Conference on Management of Data, Jun. 2019, pp. 1535-1552.

Hynes, et al., A Demonstration of Sterling: A Privacy-Preserving Data Marketplace, In Proc. VLDB Endow., Aug. 2018, vol. 11, No. 12, pp. 2086-2089.

IBM, What's Next in AI Is Generative Computing, Retrieved from: https://research.ibm.com/artificial-intelligence, 2020, 8 pages.

Koutris, et al., Query-Based Data Pricing, J. Acm, Nov. 2, 2015, vol. 62, No. 5, p. 43:1-43:44.

Koutsos, et al., Agora: A Privacy-aware Data Marketplace, IEEE 40th International Conference on Distributed Computing Systems (ICDCS), Nov. 29, 2020, pp. 1211-1212.

Liu et al., Dealer: An End-To-End Model Marketplace With Differential Privacy, Proceedings of the VLDB Endowment, Feb. 1, 2021, vol. 14, Issue 6, 13 pages.

Travizano, et al., Wibson: A Decentralized Data Marketplace, arXiv:1812.09966 [cs], Dec. 13, 2018, 6 pages.

* cited by examiner

DIGITAL ARTIFACT MARKETPLACE

BACKGROUND

The present disclosure relates generally to the field of a digital marketplace, and more particularly to storage, search, acquisition, and composition of digital artifacts (e.g., workflow patterns, node outputs, and results of intermediate computations). The present disclosure relates to the use of techniques for creation of persistent checkpoints in an execution of workflows, leveraging technologies for the composition of workflow nodes and subgraphs.

A digital marketplace can be an online platform for both sellers and buyers. The digital marketplace can match a buyer seeking a service or product with a seller or provider of those products or services. A digital marketplace may help businesses sell their products, grow, and be profitable. Operators of digital marketplaces may streamline the process of selling and servicing. A digital marketplace is a platform creating a venue for both buyers and sellers to transact over a product or a service. A digital marketplace may match potential buyers of a service or a product with providers of that service or product. A digital marketplace may play an intermediary role between buyers and sellers.

U.S. patent publication 2019/0171620 discloses that a data processing method, system, and computer program product include acquiring data of customer-defined internal and external sources, absorbing data into standardized structures which can be homogenously processed; curating data through a configurable workflow of a plurality of ready-made modules including any of optical character recognition, natural language processing, and associative graph loading, and syndicating the resulting data products via turnkey client apps and widgets for data sharing, visualization and granular monetization in a single, cohesive, digital marketplace.

U.S. Pat. No. 9,990,195 discloses that at least one application is received from a user. The at least one application is stored on a communication platform. A catalog is received. The catalog includes at least one service. Each service of the at least one service is associated with a platform. An indication of a selection, from the user, is received. The selection comprises a first service associated with a first platform, and a second service associated with a second platform. The first service stores the at least one application from the user. The second service runs the at least one application from the user. Responsive to receiving the indication, the at least one application is deployed to the indicated first platform. Additionally, responsive to receiving the indication, a service bridge from the communication platform to the second platform is deployed. The at least one application is run on the first platform utilizing the service bridge.

U.S. Pat. No. 10,693,989 discloses that a proxy service broker on a hoster Platform as a Service (PaaS) receives a request for a service catalog including PaaS services available from a partner PaaS. Using the proxy service broker, creation of an instance of a partner PaaS service selected from the service catalog is initiated. Using the proxy service broker, a call is transmitted to a partner service broker on the partner PaaS to create the instance of the partner PaaS service executing on the partner PaaS. An application is deployed on the hoster PaaS to consume the instance of the partner PaaS service. The deployed application is bound with the instance of the partner PaaS service and directly consumes the bound partner PaaS service.

SUMMARY

Certain shortcomings of the prior art are overcome, and additional advantages are provided through the provision of an approach for storage, search, acquisition, and composition of a digital artifact. Advantageously, a processor obtains the digital artifact in a digital marketplace platform. The digital artifact is a collection of digital data with automatically generated and verifiable provenance and usage data. A processor transforms the digital artifact to define an access privilege. A processor shares the digital artifact in the digital marketplace platform by providing a view of a catalogue including the digital artifact. A processor authorizes a usage request based on the access privilege. A processor rewards a source of the digital artifact based on the usage of the digital artifact.

In one or more embodiments, a computer-implemented method is provided to obtain a digital artifact in a digital marketplace platform. The digital artifact can be a collection of digital data with automatically generated and verifiable provenance and usage information, e.g., provenance metadata and usage metadata. The digital artifact may refer to documents, data, and configuration parameters that are produced by a collection of linked tasks (e.g., workflows, definitions of workflows or parts of workflows). Advantageously, the provenance information may refer to a record of a process and entities that have either originated the data in question, or produced the data by transforming existing data, or both. Advantageously, the computer-implemented method may query for a digital artifact which may have been generated by a workflow. Advantageously, the computer-implemented method may transform a digital artifact for data privacy/security rules and data pre/post-processing. Advantageously, the computer-implemented method may annotate a digital artifact that has been generated via a sequence pipeline of operations, e.g., a workflow, or a subgraph of a workflow. Advantageously, the computer-implemented method may provide a user to submit a digital artifact along with automatically generated and verifiable provenance information in the digital marketplace platform. The computer-implemented method may collect usage metadata and provenance metadata. Advantageously, the computer-implemented method may automatically push a new artifact to the digital marketplace platform as well as updating an existing digital artifact with an improved version.

In one or more embodiments, a computer-implemented method is provided to transform a digital artifact to define an access privilege. Advantageously, the computer-implemented method may transform a digital artifact by annotating data-security metadata to define the access privilege for a user. For example, a marketplace engine may transform a digital artifact used to account for data security rules and data pre/post-processing. Advantageously, the marketplace engine may use a privacy propagation algorithm to annotate a digital artifact which has been generated via a sequence, graph, and pipeline of operations, e.g., a workflow, or a subgraph of a workflow. The computer-implemented method may annotate a digital artifact with data-privacy/data-security metadata to restrict or allow access to a user (e.g., a customer or a provider) based on the access privilege of the user. Advantageously, the computer-implemented method may approve a digital artifact before the digital artifact becomes available to a user. The computer-implemented method may perform the approval process by one or more authority users.

In one or more embodiments, a computer-implemented method is provided to share a digital artifact in a digital marketplace platform by providing a view of a catalogue including the digital artifact. Advantageously, the computer-implemented method may upload a digital artifact to the digital marketplace platform. Advantageously, the computer-implemented method may catalog a digital artifact into a catalogue, e.g., in an artifact catalogue database. The computer-implemented method may catalog a digital artifact, including a workflow, a workflow sub-graph, an intermediate and final file that a workflow node may produce. A marketplace engine may download a digital artifact from the digital marketplace platform. A marketplace engine may view a catalogue of a digital artifact. Advantageously, a user may reuse any of the catalogued digital artifacts in workflows of the digital artifacts. Advantageously, a user may reuse a digital artifact that other users have computed. Advantageously, the computer-implemented method may automate a process of data reuse, even across the boundaries of organizations. Advantageously, the computer-implemented method may optimize the execution of related pipelines and computational workflows by reusing information in a digital artifact. Advantageously, an orchestrator (and or scheduler) may optimize the execution of related pipelines and computational workflows by reusing information in a digital artifact. An orchestrator may communicate with a marketplace engine on behalf of one or more users (e.g., a client) to get access to zero or more digital artifacts and the digital artifacts during the execution of a workflow. Advantageously, a client 104 may configure an orchestrator to push data into a digital marketplace platform including provenance metadata, new digital artifacts, or updated digital artifacts.

In one or more embodiments, a computer-implemented method is provided to authorize a usage request based on an access privilege. Advantageously, the computer-implemented method may evaluate the usage request for the digital artifact. The computer-implemented method may reject a usage request if the usage request fails to meet a pre-defined standard. Advantageously, the computer-implemented method may approve or reject a digital artifact submitted by a user, based on a pre-defined standard or an access privilege. The computer-implemented method may post-process a digital artifact once the digital artifact has been approved and submitted in a digital marketplace platform. The computer-implemented method may approve a digital artifact before the digital artifact becomes available to a user. Advantageously, the computer-implemented method may perform the approval process by one or more authority users.

In one or more embodiments, a computer-implemented method is provided to reward a source of a digital artifact based on the usage of the digital artifact. Advantageously, the computer-implemented method may determine a value of the digital artifact based on a value evaluation of the digital artifact. The computer-implemented method may compute and determine the value (e.g., a price) of a digital artifact (e.g., for an auction, or for a specified customer or provider). Advantageously, the computer-implemented method may reward a user who submits a digital artifact to the digital marketplace platform. Advantageously, the computer-implemented method may reward a user whenever a different user reuses the digital artifact submitted by the user. In an example, the computer-implemented method may reward the user with a digital currency in a decentralized finance network. Advantageously, the computer-implemented method may incentivize a user to submit a digital artifact. Advantageously, the computer-implemented method may charge a user for a value in one or more tokens and may reward a user in one or more tokens whenever the user submits a digital artifact, and/or whenever a different user reuses the digital artifact submitted by the user. In an example, the currency can be a real-world currency, goods, service, product, digital currency, or some combination. Advantageously, the computer-implemented method may generate or update provenance information of a digital artifact, in a pre/post process, which can be recorded back into tracking the digital artifact. Advantageously, the computer-implemented method may generate or update usage information of a digital artifact, in a pre/post process, which can be recorded back into tracking the digital artifact. Advantageously, the computer-implemented method may automatically push a new artifact to the digital marketplace platform as well as updating an existing digital artifact with an improved version.

In another aspect, a computer program product is provided which includes one or more computer readable storage media, and program instructions collectively stored on the one or more computer readable storage media. Advantageously, program instructions obtain the digital artifact in a digital marketplace platform. The digital artifact is a collection of digital data with automatically generated and verifiable provenance and usage data. Program instructions transform the digital artifact to define an access privilege. Program instructions share the digital artifact in the digital marketplace platform by providing a view of a catalogue including the digital artifact. Program instructions authorize a usage request based on the access privilege. Program instructions reward a source of the digital artifact based on the usage of the digital artifact.

In a further aspect, a computer system is provided which includes one or more computer processors, one or more computer readable storage media, and program instructions stored on the one or more computer readable storage media for execution by at least one of the one or more computer processors. Advantageously, program instructions obtain the digital artifact in a digital marketplace platform. The digital artifact is a collection of digital data with automatically generated and verifiable provenance and usage data. Program instructions transform the digital artifact to define an access privilege. Program instructions share the digital artifact in the digital marketplace platform by providing a view of a catalogue including the digital artifact. Program instructions authorize a usage request based on the access privilege. Program instructions reward a source of the digital artifact based on the usage of the digital artifact.

Additional features and advantages are realized through the techniques of the present invention. Other embodiments and aspects of the invention are described in detail herein and are considered a part of the claimed invention.

DETAILED DESCRIPTION

Figure 1:
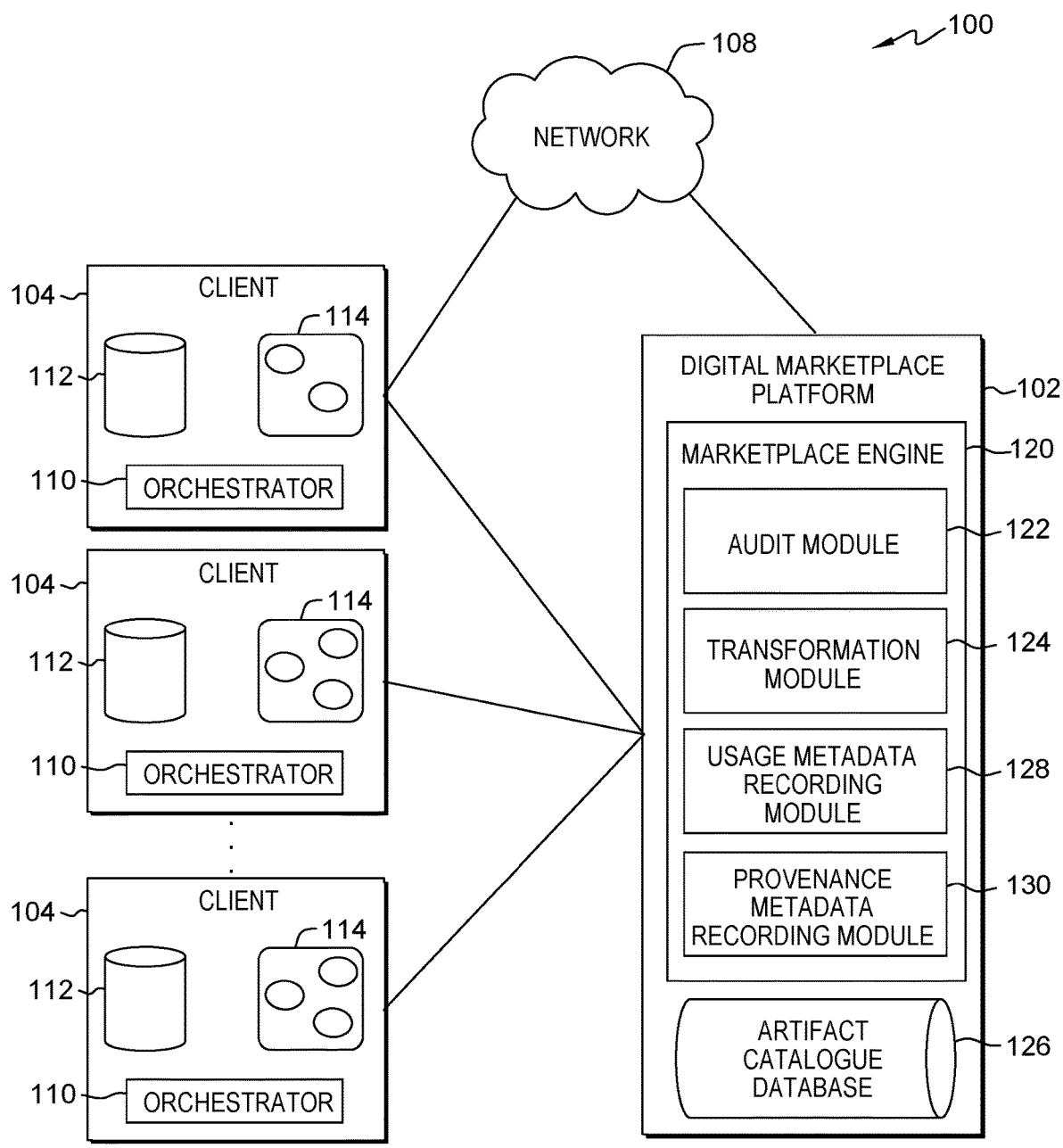
FIG. 1 is a functional block diagram illustrating a digital marketplace environment, in accordance with an embodiment of the present disclosure.

The present disclosure is directed to systems and methods for storage, search, acquisition, and composition of digital artifacts (e.g., workflow patterns, node outputs, and results of intermediate computations). The present disclosure relates to the use of techniques for creation of persistent checkpoints in an execution of workflows, leveraging technologies for the composition of workflow nodes and subgraphs.

Embodiments of the present disclosure recognize a need for a digital marketplace for digital artifacts which can be an intermediate or final output of a data-pipeline (e.g., workflows). Embodiments of the present disclosure disclose enabling a user of a digital artifact marketplace to reuse digital artifacts that any user of the digital artifact marketplace have computed or generated. Embodiments of the present disclosure disclose incentivizing a user to contribute digital artifacts in the digital marketplace for other users to use. Embodiments of the present disclosure disclose the use of a token (e.g., a digital currency). Embodiments of the present disclosure disclose reusing digital artifacts and earning some tokens by a user to submit a digital artifact for other users to use. Embodiments of the present disclosure disclose systems and methods for the creation of persistent checkpoints in the execution of workflows, leveraging technologies for the composition of workflow nodes and subgraphs. Embodiments of the present disclosure disclose systems and methods for the storage, search, acquisition, and composition of digital artifacts (e.g., workflow patterns, node outputs, and results of intermediate computations).

Embodiments of the present disclosure recognize a need for an individual or team to reuse digital artifacts. Embodiments of the present disclosure recognize a need for multiple such groups to pool together digital artifacts and to reuse the digital artifacts. Embodiments of the present disclosure recognize a need for selecting a digital artifact with the most performant or optimized implementation and improving the orchestration of workflows and consumption of computation results thereby boosting the productivity of a user. Embodiments of the present disclosure recognize a need for sharing data among organizations. The act of sharing data between organizations typically must adhere to some strict regulations and rules. Embodiments of the present disclosure disclose automating the process of data reuse, even across the boundaries of organizations. Embodiments of the present disclosure disclose an environment that organizations can use to optimize workflow definitions and executions. Embodiments of the present disclosure disclose promoting the re-use of assets and intermediate/final datasets. Embodiments of the present disclosure disclose enabling an organization to reap benefits of asset reuse without spending much effort, e.g., in the context of cloud and hybrid-cloud computing.

Embodiments of the present disclosure disclose cataloging digital artifacts in a digital artifact marketplace. Embodiments of the present disclosure disclose recording artifact usage metadata (e.g., which user, how many times). Embodiments of the present disclosure disclose recording artifact provenance metadata (e.g., the time, the process and entities that have either originated the data in question, or produced the data by transforming existing data, or both). Embodiments of the present disclosure disclose rewarding a client for submitting a digital artifact or when the submitted artifact is used by other clients. Embodiments of the present disclosure disclose charging a client for using a digital artifact in the digital artifact marketplace. Embodiments of the present disclosure disclose an audit layer in a digital artifact marketplace that may approve a digital artifact request, may approve the digital artifact usage, and may post-process the digital artifact. The audit layer in a digital artifact marketplace may also reject a request to add a digital artifact to the marketplace catalogue and a request to reuse a digital artifact from the marketplace catalogue. Embodiments of the present disclosure disclose systems and methods for a client to request a digital artifact, submit a digital artifact, and query a digital artifact. Embodiments of the present disclosure disclose systems and methods for a client to view a catalogue of digital artifacts in a digital artifact marketplace. In an example, the client can be a computer cluster with one or more instances, each of which may host one or more workflow orchestrators and one or more local digital artifacts databases. For example, an orchestrator may execute one or more workflows instances. An orchestrator may store information about the workflows, including digital artifacts metadata to a local database. An orchestrator may get digital artifacts from a digital artifact marketplace and may store the digital artifacts in a local database. In an example, an orchestrator may use a digital artifact to compose optimized workflow instances and to optimize the execution of active workflow instances. An orchestrator may push some of the local digital artifacts to a digital artifact marketplace. An orchestrator may revoke a digital artifact that has been submitted to the digital artifact marketplace. Embodiments of the present disclosure disclose a catalogue of available digital artifacts acting as a proxy to forward a request to an appropriate cluster digital artifact database. An orchestrator may also fulfill a standing request for a digital artifact by producing and then submitting the digital artifact to the digital artifact marketplace.

Embodiments of the present disclosure disclose a digital artifact marketplace with support for pre/post-process steps and bids. Embodiments of the present disclosure disclose sharing digital artifacts which may have been generated by a workflow. Embodiments of the present disclosure disclose querying the digital marketplace for artifacts that may have been generated by a workflow. Embodiments of the present disclosure disclose downloading or uploading a digital artifact from/to the marketplace. Embodiments of the present disclosure disclose transforming an artifact (e.g., for data privacy security and data pre/post-processing). Embodiments of the present disclosure disclose a privacy propagation algorithm to annotate a digital artifact which has been generated via a sequence, graph, or pipeline operation (e.g., a workflow, or a subgraph of a workflow). Embodiments of the present disclosure disclose computing and deciding the value of a digital artifact (e.g., for an auction, a specific customer or provider). Embodiments of the present disclosure disclose a workflow execution engine that can generate a digital artifact, reuse an existing artifact to generate a new digital artifact, submit an artifact to the digital artifact marketplace, and apply transformations to a digital artifact.

In an example, there can be two types of users in a digital artifact marketplace. One is a customer that may use a digital artifact. Another one can be a provider that can provide a digital artifact that a customer can use. A user can be as both a customer and a provider. Embodiments of the present disclosure disclose that a customer may ask for an artifact, open an auction to buy an artifact, and view a provider's bid and pick one or more bids. Embodiments of the present disclosure disclose that a provider can be asked to generate an artifact, bid to a customer's request, and push an existing artifact into a digital marketplace. Embodiments of the present disclosure disclose that a customer may use multiple clusters each of which consumes multiple artifacts. Similarly, a provider may use multiple clusters to produce multiple artifacts. Each cluster may use one or more workflow execution engines to apply pre/post transformation steps whose instructions may be stored in an artifact transformation catalogue. Embodiments of the present disclosure disclose that a provider may earn token (e.g., digital currency) whenever one of the artifacts the provider has submitted is reused by a customer. A customer may transfer a token to a provider so that the provider may make one of the artifacts (or computing resources) available to a subgraph of the marketplace for some fixed or indefinite duration. A customer may open an auction and choose a provider which makes the most attractive bid. Embodiments of the present disclosure disclose a decentralized digital artifact marketplace in which a user may exchange and store digital artifacts as well as the corresponding metadata.

Embodiments of the present disclosure disclose systems and methods for a digital marketplace where a user can submit a digital artifact along with automatically generated and verifiable provenance information. A digital artifact may refer to documents, data, configuration parameters that may be produced by a collection of linked tasks (e.g., workflows) and definitions of workflows or parts of workflows. Provenance may refer to a record of the process and entities that have either originated the data in question, or produced the data by transforming existing data, or both. Embodiments of the present disclosure disclose systems and methods where information in such digital artifacts can be re-used by a workflow orchestrator to optimize the execution of related pipelines and computational workflows. A workflow orchestrator or its scheduler can communicate with the system on behalf of one or more users to get access to zero or more digital artifacts and use the digital artifacts during the execution of a workflow. In an example, a user may configure a workflow orchestrator to push data into the system including provenance metadata, new digital artifacts, or updated digital artifacts. Embodiments of the present disclosure disclose systems and methods which may incentivize a user to submit a digital artifact. The system may charge a user for a value in one or more tokens and may reward a user in one or more tokens whenever the user submits a digital artifact, or whenever a different user reuses the digital artifact submitted by the user. In an example, a token or currency can be real-world currency, goods, service, product, or some digital currency, or some combination.

Embodiments of the present disclosure disclose systems and methods which can pre/post process a digital artifact before or after retrieval by a user based on the user's need and the needs of other users. In an example, the pre/post process may generate provenance information (e.g., the time, the process and entities that have either originated the data in question, or produced the data by transforming existing data, or both) which may be recorded back into the system. In an example, the pre/post process may generate usage metadata (e.g., which user, how many times) which may be recorded back into the system. Embodiments of the present disclosure disclose annotating a digital artifact with data-privacy and data-security metadata to restrict or allow access to a user based on the user's access privilege and rules governing the access to digital artifacts on the granularity of an individual digital artifact or granularity of groups of digital artifacts. Embodiments of the present disclosure disclose systems and methods where a digital artifact must be greenlit before the digital artifact becomes available to a user. In an example, the greenlit process can be performed by the system or an authority user. Embodiments of the present disclosure disclose systems and methods where a user may access the system by taking part in one or more decentralized networks.

The present disclosure will now be described in detail with reference to the Figures. FIG. 1 is a functional block diagram illustrating a digital marketplace environment, generally designated 100, in accordance with an embodiment of the present disclosure.

In the depicted embodiment, digital marketplace environment 100 includes digital marketplace platform 102, client(s) 104, and network 108. In various embodiments of the present disclosure, client(s) 104 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, client(s) 104 represent a computing system utilizing clustered computers and components to act as a single pool of seamless resources. In other embodiments, client(s) 104 may represent a server computing system utilizing multiple computers as a server system, such as in a cloud computing environment. In general, client(s) 104 can be any computing device or a combination of devices with access to digital marketplace platform 102 and network 108. Client(s) 104 may include internal and external hardware components, as depicted and described in further detail with respect to FIG. 6.

Further, in the depicted embodiment, each client 104 includes local database 112, workflow instance(s) 114, and orchestrator 110. In the depicted embodiment, local database 112, workflow instance(s) 114, and orchestrator 110 are located on client(s) 104. However, in other embodiments, local database 112, workflow instance(s) 114, and orchestrator 110 may be located externally and accessed through a communication network such as network 108. In an example, each client 104 can be a cluster with one or more instances 114. Each client 104 may host one or more orchestrators 110. Each client 104 may host one or more local databases 112 which can be digital artifacts databases. In an example, client 104 can be two types of users. For example, client 104 can be a customer that may wish to use a digital artifact. In an example, a digital artifact request may contain requirements (e.g., metadata) indicating schema and/or rules that the digital artifact must conform to. A digital artifact may be generated by computational workflows and be consumed by computational workflows. A digital artifact may also be a workflow definition, or data/pipeline. A client request to digital marketplace platform 102 (and results from digital marketplace platform 102 back to client 104) may be audited and mutated, e.g., by an audit layer.

Client 104 can be a provider that can provide a digital artifact. In some cases, a user can act as both types. In an example, a customer can ask for an artifact. A customer can open an auction to buy an artifact. A customer can view providers' bids and may select one or more desired bids. A provider can be asked to generate an artifact. A provider may bid to a customer's request. A provider may push an existing artifact to digital marketplace platform 102. In another example, a customer may use multiple clusters, each of which may consume multiple artifacts. Similarly, a provider may use multiple clusters to produce multiple artifacts. Each cluster may use one or more workflow execution engines to apply pre/post transformation steps whose instructions may be stored in an artifact transformation catalogue (e.g., artifact catalogue database 126). In an example, a provider may earn a token (e.g., a digital currency) whenever one of the artifacts the provider has submitted is reused by a customer. A customer may transfer a token (e.g., a digital currency) to a provider so that the provider may make one of the provider's artifacts (even a computing resource) available to digital marketplace platform 102 (or a subgraph of digital marketplace platform 102) for some fixed or indefinite duration. A customer may open an auction for a digital artifact and may choose a provider that makes the most attractive bid. In some examples, a provider may submit a digital artifact in digital marketplace platform 102, but only the chosen provider will be reimbursed by the customer with the agreed token/digital-currency amount. A provider may choose to submit a digital artifact in digital marketplace platform 102 for free.

In one or more embodiments, orchestrator 110 is configured to execute one or more workflow instances 114. Orchestrator 110 may store information about the workflows, including digital artifacts metadata to artifact catalogue database 126. Orchestrator 110 may get a digital artifact from digital marketplace platform 102. Orchestrator 110 may store a digital artifact in local database 112. Orchestrator 110 may use a digital artifact to compose optimized workflow instances, or to optimize the execution of active workflow instances. Orchestrator 110 may push some of local digital artifacts to digital marketplace platform 102. Orchestrator 110 may revoke a digital artifact that orchestrator 110 has submitted to digital marketplace platform 102.

In various embodiments of the present disclosure, digital marketplace platform 102 can be a platform for entities to share digital artifacts. A digital artifact can be a collection of digital data, often in the form of a sequence of bytes, representing a digital object. A digital artifact can be of any content types including text, audio, video, image, animation or a combination. In an example, a digital artifact may be an intermediate or final output of a data-pipeline (e.g., workflow). High-performance computing may be the use of parallel processing for running advanced application programs efficiently, reliably, and quickly. A task can be a computer operation, program execution, or invocation of a service. A workflow can be a sequence of tasks to be executed to carry out some computation, for example on a high-performance computing resource. Such tasks can either include jobs running on the high-performance computing resource or an auxiliary task that may run outside the high-performance computing resource. A pipeline can be a sequence of tasks. Digital marketplace platform 102 may automate the process of data reuse, even across the boundaries of organizations. Digital marketplace platform 102 may catalog digital artifacts. Digital marketplace platform 102 may record artifact use metadata (e.g., by which client, how many times). Digital marketplace may record provenance metadata (e.g., the time, the process and entities that have either originated the data in question, or produced the data by transforming existing data, or both). Digital marketplace platform 102 may reward clients 104 for submitting a digital artifact and/or when the digital artifact is used by other clients. Digital marketplace platform 102 may charge clients 104 for using a digital artifact. Digital marketplace platform 102 may approve or reject a digital artifact request. Digital marketplace platform 102 may reject a digital artifact request. Digital marketplace platform 102 may approve or reject a digital artifact. Digital marketplace platform 102 may postprocess a digital artifact. Digital marketplace platform 102 may accelerate workflows.

In various embodiments of the present disclosure, digital marketplace platform 102 can be a laptop computer, a tablet computer, a netbook computer, a personal computer (PC), a desktop computer, a mobile phone, a smartphone, a smart watch, a wearable computing device, a personal digital assistant (PDA), or a server. In another embodiment, digital marketplace platform 102 represents a computing system utilizing clustered computers and components to act as a single pool of seamless resources. In other embodiments, digital marketplace platform 102 may represent a server computing system utilizing multiple computers as a server system, such as in a cloud computing environment. In general, digital marketplace platform 102 can be any computing device or a combination of devices with access to marketplace engine 120 and network 108 and is capable of processing program instructions and executing marketplace engine 120, in accordance with an embodiment of the present disclosure. digital marketplace platform 102 may include internal and external hardware components, as depicted and described in further detail with respect to FIG. 6.

Further, in the depicted embodiment, digital marketplace platform 102 includes marketplace engine 120 and artifact catalogue database 126. In the depicted embodiment, marketplace engine 120 and artifact catalogue database 126 are located on digital marketplace platform 102. However, in other embodiments, marketplace engine 120 and artifact catalogue database 126 may be located externally and accessed through a communication network such as network 108. The communication network can be, for example, a local area network (LAN), a wide area network (WAN) such as the Internet, or a combination of the two, and may include wired, wireless, fiber optic or any other connection known in the art. In general, the communication network can be any combination of connections and protocols that will support communications between digital marketplace platform 102 and marketplace engine 120 and artifact catalogue database 126, in accordance with a desired embodiment of the disclosure.

In one or more embodiments, artifact catalogue database 126 includes a catalogue of available digital artifacts. Artifact catalogue database 126 may act as a proxy to forward a request to an appropriate cluster digital artifact database (e.g., local database 112).

In one or more embodiments, marketplace engine 120 is configured to obtain a digital artifact, e.g., from client 104. The digital artifact can be a collection of digital data with automatically generated and verifiable provenance and usage information, e.g., provenance metadata and usage metadata. The digital artifact may refer to documents, data, configuration parameters that are produced by a collection of linked tasks (e.g., workflows, definitions of workflows or parts of workflows). The provenance information may refer to a record of a process and entities that have either originated the data in question, or produced the data by transforming existing data, or both. Marketplace engine 120 may share a digital artifact that may have been generated by a workflow. Marketplace engine 120 may query for a digital artifact which may have been generated by a workflow. Marketplace engine 120 may download and upload a digital artifact from/to digital marketplace platform 102. Marketplace engine 120 may transform a digital artifact for data privacy/security rules and data pre/post-processing. Marketplace engine 120 may annotate a digital artifact that has been generated via a sequence pipeline of operations, e.g., a workflow, or a subgraph of a workflow. Marketplace engine 120 may compute and determine the value of a digital artifact (e.g., for an auction, for a specified customer or provider). Marketplace engine 120 may generate a digital artifact. Marketplace engine 120 may reuse an existing digital artifact to generate new digital artifacts. Marketplace engine 120 may apply transformations to a digital artifact. Marketplace engine 120 may provide a support for pre/post-process steps and bids. Marketplace engine 120 may provide a user to submit a digital artifact along with automatically generated and verifiable provenance information in digital marketplace platform 102. Marketplace engine 120 may collecting provenance metadata. Marketplace engine 120 may automatically push a new artifact to digital marketplace platform 102 as well as updating an existing digital artifact with an improved version.

In one or more embodiments, marketplace engine 120 is configured to transform a digital artifact to define an access privilege. Marketplace engine 120 may transform a digital artifact by annotating data-security metadata to define the access privilege for a user. For example, marketplace engine 120 may transform a digital artifact used to account for data security rules and data pre/post-processing. Marketplace engine 120 may use a privacy propagation algorithm to annotate a digital artifact which has been generated via a sequence, graph, and pipeline of operations, e.g., a workflow, or a subgraph of a workflow. Marketplace engine 120 may annotate a digital artifact with data-privacy/data-security metadata to restrict or allow access to a user (e.g., a customer or a provider) based on the access privilege of the user. Marketplace engine 120 may approve a digital artifact before the digital artifact becomes available to a user. Marketplace engine 120 may perform the approval process by one or more authority users.

In one or more embodiments, marketplace engine 120 is configured to share a digital artifact in digital marketplace platform 102 by providing a view of a catalogue including the digital artifact. Marketplace engine 120 may record usage metadata for digital artifacts. Marketplace engine 120 may record provenance metadata for digital artifacts. Marketplace engine 120 may upload a digital artifact to digital marketplace platform 102. Marketplace engine 120 may catalog a digital artifact into a catalogue, e.g., in artifact catalogue database 126. 1. Marketplace engine 120 may catalog a digital artifact, including a workflow, a workflow sub-graph, an intermediate and final file that a workflow node may produce. Marketplace engine 120 may query a digital artifact in digital marketplace platform 102. Marketplace engine 120 may reuse a digital artifact by orchestrator 110 to optimize execution of related pipelines and computational workflows. Marketplace engine 120 may download a digital artifact from digital marketplace platform 102. Marketplace engine 120 may view a catalogue of a digital artifact. Marketplace engine 120 may reuse any of the catalogued digital artifacts in workflows of the digital artifacts. Marketplace engine 120 may reuse a digital artifact that other users have computed. Marketplace engine 120 may automate a process of data reuse, even across the boundaries of organizations. Marketplace engine 120 may optimize the execution of related pipelines and computational workflows by reusing information in a digital artifact. Orchestrator 110 may optimize the execution of related pipelines and computational workflows by reusing information in a digital artifact. Orchestrator 110 (and or scheduler) may communicate with marketplace engine 120 on behalf of one or more users (e.g., clients 104) to get access to zero or more digital artifacts and the digital artifacts during the execution of a workflow. Client 104 may configure orchestrator 110 to push data into digital marketplace platform 102 including provenance metadata, new digital artifacts, or updated digital artifacts.

In one or more embodiments, marketplace engine 120 is configured to authorize a usage request based on an access privilege. Marketplace engine 120 may evaluate the usage request for the digital artifact. Marketplace engine 120 may reject a usage request if the usage request fails to meet a pre-defined standard or an access privilege rule. Marketplace engine 120 may approve or reject a digital artifact submitted by a user, based on a pre-defined standard or an access privilege rule. Marketplace engine 120 may post-process a digital artifact once the digital artifact has been approved and submitted in digital marketplace platform 102. Marketplace engine 120 may approve a digital artifact before the digital artifact becomes available to a user. Marketplace engine 120 may perform the approval process by one or more authority users. Marketplace engine 120 may approve or reject a request to re-use a digital artifact. Marketplace engine 120 may approve or reject a digital artifact to be added into digital marketplace platform 102. Marketplace engine 120 may transform an artifact request. Marketplace engine 120 may transform an artifact.

In one or more embodiments, marketplace engine 120 is configured to reward a source (e.g., a provider) of the digital artifact based on the usage of the digital artifact. Marketplace engine 120 may determine a value (e.g., a price) of the digital artifact based on a value evaluation of the digital artifact. Marketplace engine 120 may evaluate a request for the digital artifact. Marketplace engine 120 may compute and determine the value of a digital artifact (e.g., for an auction, or for a specified customer or provider). Marketplace engine 120 may charge a user for using a digital artifact. Marketplace engine 120 may reward a user who submits a digital artifact to digital marketplace platform 102. Marketplace engine 120 may reward a user whenever a different user reuses the digital artifact submitted by the user. Marketplace engine 120 may reward the user with a digital currency in a decentralized finance network. Marketplace engine 120 may incentivize a user to submit a digital artifact. Marketplace engine 120 may record the changes to a digital artifact value. Marketplace engine 120 may record how much users were charged to reuse a digital artifact. Marketplace engine 120 may record usage metadata of the digital artifact. Marketplace engine 120 may charge a user for a value in one or more currencies and may reward a user in one or more currencies whenever the user submits a digital artifact, and/or whenever a different user reuses the digital artifact submitted by the user. In an example, the currency can be a real-world currency, goods, service, digital currency, or some combination. Marketplace engine 120 may pre/post process a digital artifact before/after being retrieval by zero or more users (e.g., customers, providers) based on the users' needs and the needs of other users. Marketplace engine 120 may generate provenance information of a digital artifact, in a pre/post process, which can be recorded back into artifact catalogue database 126 tracking the digital artifact and/or the digital artifact value. Marketplace engine 120 may collect provenance metadata. Marketplace engine 120 may automatically push a new artifact to digital marketplace platform 102 as well as updating an existing digital artifact with an improved version.

Further, in the depicted embodiment, marketplace engine 120 includes audit module 122 and transformation module 124. In the depicted embodiment, audit module 122, transformation module 124, usage metadata recording module 128, and provenance metadata recording module 130 are located on digital marketplace platform 102 and marketplace engine 120. However, in other embodiments, audit module 122, transformation module 124, usage metadata recording module 128, and provenance metadata recording module 130 may be distributed between multiple platforms and multiple computing environments and accessed through a communication network such as network 108.

In one or more embodiments, audit module 122 is configured to authorize a usage request based on an access privilege. Audit module 122 may evaluate the usage request for the digital artifact. Audit module 122 may reject a usage request if the usage request fails to meet a pre-defined standard. Audit module 122 may approve or reject a digital artifact submitted by a user, based on a pre-defined standard or an access privilege. Audit module 122 may post-process a digital artifact once the digital artifact has been approved and submitted in digital marketplace platform 102. Audit module 122 may approve a digital artifact before the digital artifact becomes available to a user. Audit module 122 may perform the approval process by one or more authority users. Audit module 122 may approve or reject a request to re-use a digital artifact. Audit module 122 may approve or reject a digital artifact to be added into digital marketplace platform 102.

In one or more embodiments, transformation module 124 is configured to transform a digital artifact to define an access privilege. Transformation module 124 may transform a digital artifact by annotating data-security metadata to define the access privilege for a user. For example, transformation module 124 may transform a digital artifact used to account for data security rules and data pre/post-processing. Transformation module 124 may use a privacy propagation algorithm to annotate a digital artifact which has been generated via a sequence, graph, and pipeline of operations, e.g., a workflow, or a subgraph of a workflow. Transformation module 124 may annotate a digital artifact with data-privacy/data-security metadata to restrict or allow access to a user (e.g., a customer or a provider) based on the access privilege of the user. Transformation module 124 may approve a digital artifact before the digital artifact becomes available to a user. Transformation module 124 may perform the approval process by one or more authority users.

In one or more embodiments, usage metadata recording module 128 is configured to record the usage metadata of a digital artifact. For example, usage metadata recording module 128 may record which user has reused a digital artifact, on which computing cluster, with what computing resources, on which date and time, how much they were charged for this usage request, etc.

In one or more embodiments, provenance metadata recording module 130 is configured to record the provenance metadata of a digital artifact. For example, provenance metadata recording module 130 may record the time, the process and entities that have either originated the data in question, or produced the data by transforming existing data, or both.

Figure 2:
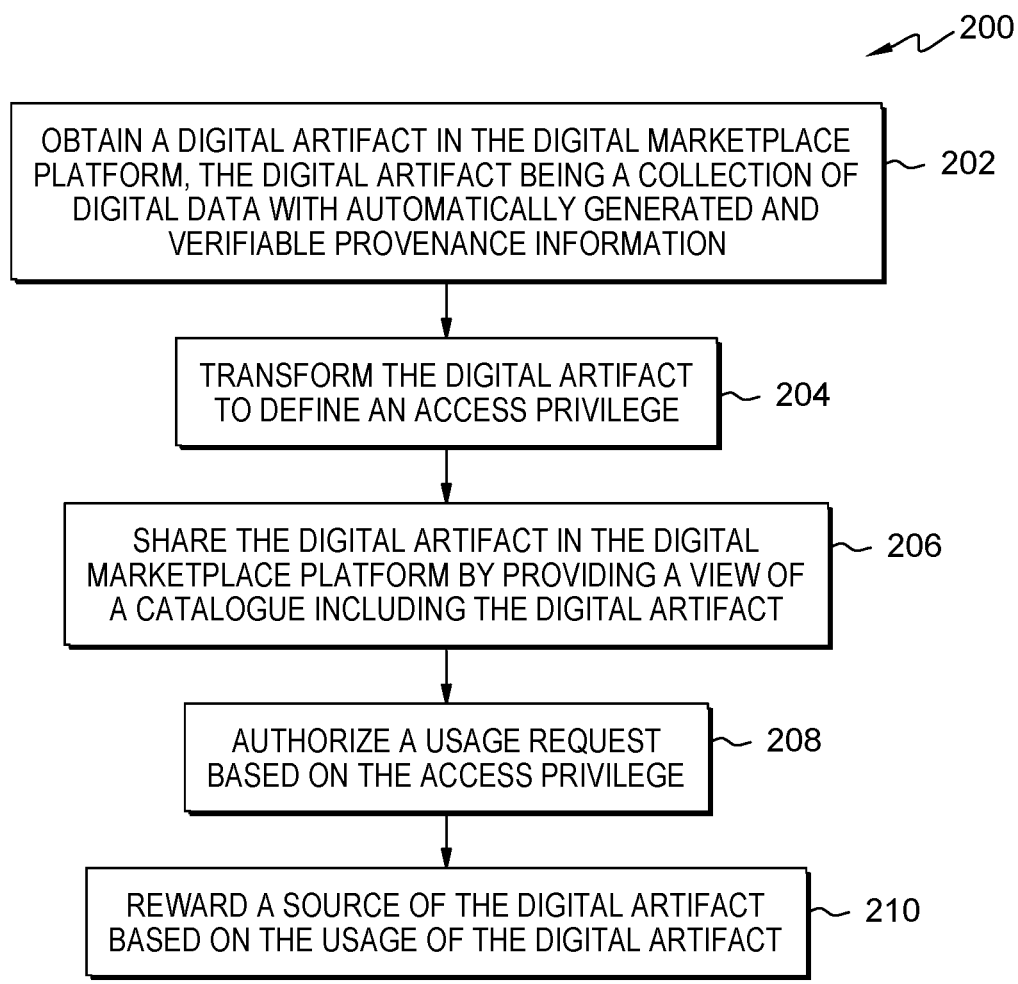
FIG. 2 is a flowchart depicting operational steps of a marketplace engine within a digital marketplace platform of FIG. 1, in accordance with an embodiment of the present disclosure.

FIG. 2 is a flowchart 200 depicting operational steps of marketplace engine 120 in accordance with an embodiment of the present disclosure.

Marketplace engine 120 operates to obtain a digital artifact in digital marketplace platform 102. The digital artifact can be a collection of digital data with automatically generated and verifiable provenance and usage information, e.g., provenance metadata and usage metadata. Marketplace engine 120 operates to transform the digital artifact to define an access privilege. Marketplace engine 120 operates to share the digital artifact in digital marketplace platform 102 by providing a view of a catalogue including the digital artifact. Marketplace engine 120 operates to authorize a usage request based on the access privilege. Marketplace engine 120 operates to reward a source (e.g., a provider) of the digital artifact based on the usage of the digital artifact.

In step 202, marketplace engine 120 obtains a digital artifact, e.g., from client 104. The digital artifact can be a collection of digital data with automatically generated and verifiable provenance and usage information, e.g., provenance metadata and usage metadata. The digital artifact may refer to documents, data, configuration parameters that are produced by a collection of linked tasks (e.g., workflows, definitions of workflows or parts of workflows). The provenance information may refer to a record of a process and entities that have either originated the data in question, or produced the data by transforming existing data, or both. Marketplace engine 120 may share a digital artifact that may have been generated by a workflow. Marketplace engine 120 may query for a digital artifact which may have been generated by a workflow. Marketplace engine 120 may download and upload a digital artifact from/to digital marketplace platform 102. Marketplace engine 120 may transform a digital artifact for data privacy/security rules and data pre/post-processing. Marketplace engine 120 may annotate a digital artifact that has been generated via a sequence pipeline of operations, e.g., a workflow, or a subgraph of a workflow. Marketplace engine 120 may compute and determine the value of a digital artifact (e.g., for an auction, for a specified customer or provider). Marketplace engine 120 may generate a digital artifact. Marketplace engine 120 may reuse an existing digital artifact to generate new digital artifacts. Marketplace engine 120 may apply transformations to a digital artifact. Marketplace engine 120 may provide a support for pre/post-process steps and bids. Marketplace engine 120 may provide a user to submit a digital artifact along with automatically generated and verifiable provenance information in digital marketplace platform 102. Marketplace engine 120 may collect usage metadata. Marketplace engine 120 may collect provenance metadata. Marketplace engine 120 may automatically push a new artifact to digital marketplace platform 102 as well as updating an existing digital artifact with an improved version.

In step 204, marketplace engine 120 transforms a digital artifact to define an access privilege. Marketplace engine 120 may transform a digital artifact by annotating data-security metadata to define the access privilege for a user. For example, marketplace engine 120 may transform a digital artifact used to account for data security rules and data pre/post-processing. Marketplace engine 120 may use a privacy propagation algorithm to annotate a digital artifact which has been generated via a sequence, graph, and pipeline of operations, e.g., a workflow, or a subgraph of a workflow. Marketplace engine 120 may annotate a digital artifact with data-privacy/data-security metadata to restrict or allow access to a user (e.g., a customer or a provider) based on the access privilege of the user. Marketplace engine 120 may approve a digital artifact before the digital artifact becomes available to a user. Marketplace engine 120 may perform the approval process by one or more authority users.

In step 206, marketplace engine 120 shares a digital artifact in digital marketplace platform 102 by providing a view of a catalogue including the digital artifact. Marketplace engine 120 may upload a digital artifact to digital marketplace platform 102. Marketplace engine 120 may catalog a digital artifact into a catalogue, e.g., in artifact catalogue database 126. Marketplace engine 120 may catalog a digital artifact, including a workflow, a workflow sub-graph, an intermediate and final file that a workflow node may produce. The request to submit a digital artifact to marketplace engine 120 may also include the provenance metadata of the artifact. Marketplace engine 120 may query digital marketplace platform 102 for the provenance metadata of the digital artifact. Marketplace engine 120 may query digital marketplace platform 102 for the usage metadata of the digital artifact. Marketplace engine 120 may query a digital artifact in digital marketplace platform 102. Marketplace engine 120 may reuse a digital artifact by orchestrator 110 to optimize execution of related pipelines and computational workflows. Marketplace engine 120 may download a digital artifact from digital marketplace platform 102. Marketplace engine 120 may view a catalogue of a digital artifact. Marketplace engine 120 may reuse any of the catalogued digital artifacts in workflows of the digital artifacts. Marketplace engine 120 may reuse a digital artifact that other users have computed. Marketplace engine 120 may automate a process of data reuse, even across the boundaries of organizations. Marketplace engine 120 may optimize the execution of related pipelines and computational workflows by reusing information in a digital artifact. Orchestrator 110 (and or scheduler) may optimize the execution of related pipelines and computational workflows by reusing information in a digital artifact. Orchestrator 110 (and or scheduler) may communicate with marketplace engine 120 on behalf of one or more users (e.g., clients 104) to get access to zero or more digital artifacts and the digital artifacts during the execution of a workflow. Client 104 may configure orchestrator 110 to push data into digital marketplace platform 102 including provenance metadata, new digital artifacts, or updated digital artifacts.

In step 208, marketplace engine 120 authorizes a usage request based on an access privilege. Marketplace engine 120 may evaluate the usage request for the digital artifact. Marketplace engine 120 may reject a usage request if the usage request fails to meet a pre-defined standard. Marketplace engine 120 may approve or reject a digital artifact submitted by a user, based on a pre-defined standard or an access privilege. Marketplace engine 120 may post-process a digital artifact once the digital artifact has been approved and submitted in digital marketplace platform 102. Marketplace engine 120 may approve a digital artifact before the digital artifact becomes available to a user. Marketplace engine 120 may perform the approval process by one or more authority users. Marketplace engine 120 may approve or reject a request to re-use a digital artifact. Marketplace engine 120 may approve or reject a digital artifact to be added into digital marketplace platform 102. Marketplace engine 120 may transform an artifact request. Marketplace engine 120 may transform an artifact. Marketplace engine 120 may update provenance data and usage metadata for each operation marketplace engine 120 performs involving a digital artifact.

In step 210, marketplace engine 120 rewards a source (e.g., a provider) of the digital artifact based on the usage of the digital artifact. Marketplace engine 120 may determine a value of the digital artifact based on a value evaluation of the digital artifact. Marketplace engine 120 may evaluate a request for the digital artifact. Marketplace engine 120 may compute and determine the value (e.g., a price) of a digital artifact (e.g., for an auction, or for a specified customer or provider). Marketplace engine 120 may charge a user for using a digital artifact. Marketplace engine 120 may reward a user who submits a digital artifact to digital marketplace platform 102. Marketplace engine 120 may reward a user whenever a different user reuses the digital artifact submitted by the user. Marketplace engine 120 may reward the user with a digital currency in a decentralized finance network. Marketplace engine 120 may incentivize a user to submit a digital artifact. Marketplace engine 120 may charge a user for a value in one or more tokens and may reward a user in one or more tokens whenever the user submits a digital artifact, and/or whenever a different user reuses the digital artifact submitted by the user. In an example, the currency can be a real-world currency, goods, service, product, digital currency, or some combination. Marketplace engine 120 may pre/post process a digital artifact before/after being retrieval by zero or more users (e.g., customers, providers) based on the users' needs and the needs of other users. Marketplace engine 120 may generate or update provenance information of a digital artifact, in a pre/post process, which can be recorded back into tracking the digital artifact. Marketplace engine 120 may collect provenance metadata. Marketplace engine 120 may generate or update usage information of a digital artifact, in a pre/post process, which can be recorded back into tracking the digital artifact. Marketplace engine 120 may automatically push a new artifact to digital marketplace platform 102 as well as updating an existing digital artifact with an improved version.

Figure 3:
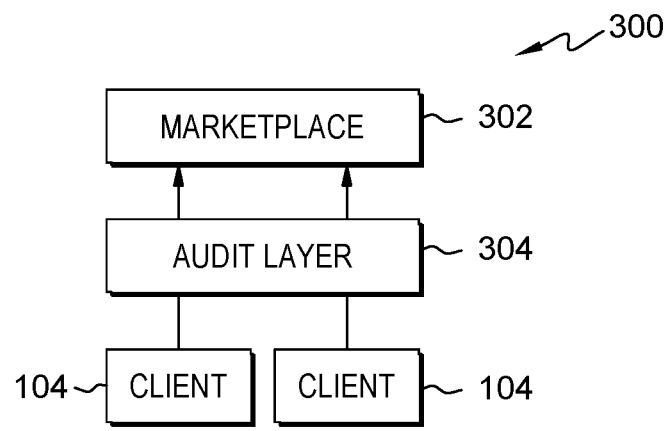
FIG. 3 illustrates an exemplary functional diagram of the marketplace engine within the digital marketplace platform of FIG. 1, in accordance with an embodiment of the present disclosure.

FIG. 3 illustrates an exemplary functional diagram of marketplace engine 120 in digital marketplace platform 102, in accordance with an embodiment of the present disclosure.

In the example of FIG. 3, client 104 can be a customer that may wish to use a digital artifact in marketplace 302 (e.g., digital marketplace platform 102). In another example, client 104 can be a provider that can provide a digital artifact in marketplace 302. In some cases, client 104 can act as both types of customers and providers. In an example, client 104 can ask for an artifact. Client 104 can open an auction to buy an artifact. Client 104 may push an existing artifact to marketplace 302. Client 104 may create a bid to fulfill an auction for a digital artifact. Client 104 can pick one or more of the available bids to their one or more auctions. Client 104 may query usage metadata of a digital artifact. Client 104 may query provenance metadata of a digital artifact. Client 104 may query metadata in the marketplace dataset about one or more digital artifacts. Client 104 may query information in the marketplace about the marketplace platform. Client 104 may query information in the marketplace about other clients. A client request to marketplace 302 (and results from marketplace 302 back to client 104) may be audited and mutated by audit layer (e.g., audit module 122). Audit module 122 may authorize a usage request based on an access privilege. Audit module 122 may evaluate the usage request for the digital artifact. Audit module 122 may reject a usage request if the usage request fails to meet a pre-defined standard. Audit module 122 may approve or reject a digital artifact submitted by client 104, based on a pre-defined standard or an access privilege. Audit module 122 may post-process a digital artifact once the digital artifact has been approved and submitted in digital marketplace platform 102. Audit module 122 may approve a digital artifact before the digital artifact becomes available to client 104. Audit module 122 may approve or reject a request to re-use a digital artifact. Audit module 122 may approve or reject a digital artifact to be added into marketplace 302.

Figure 4:
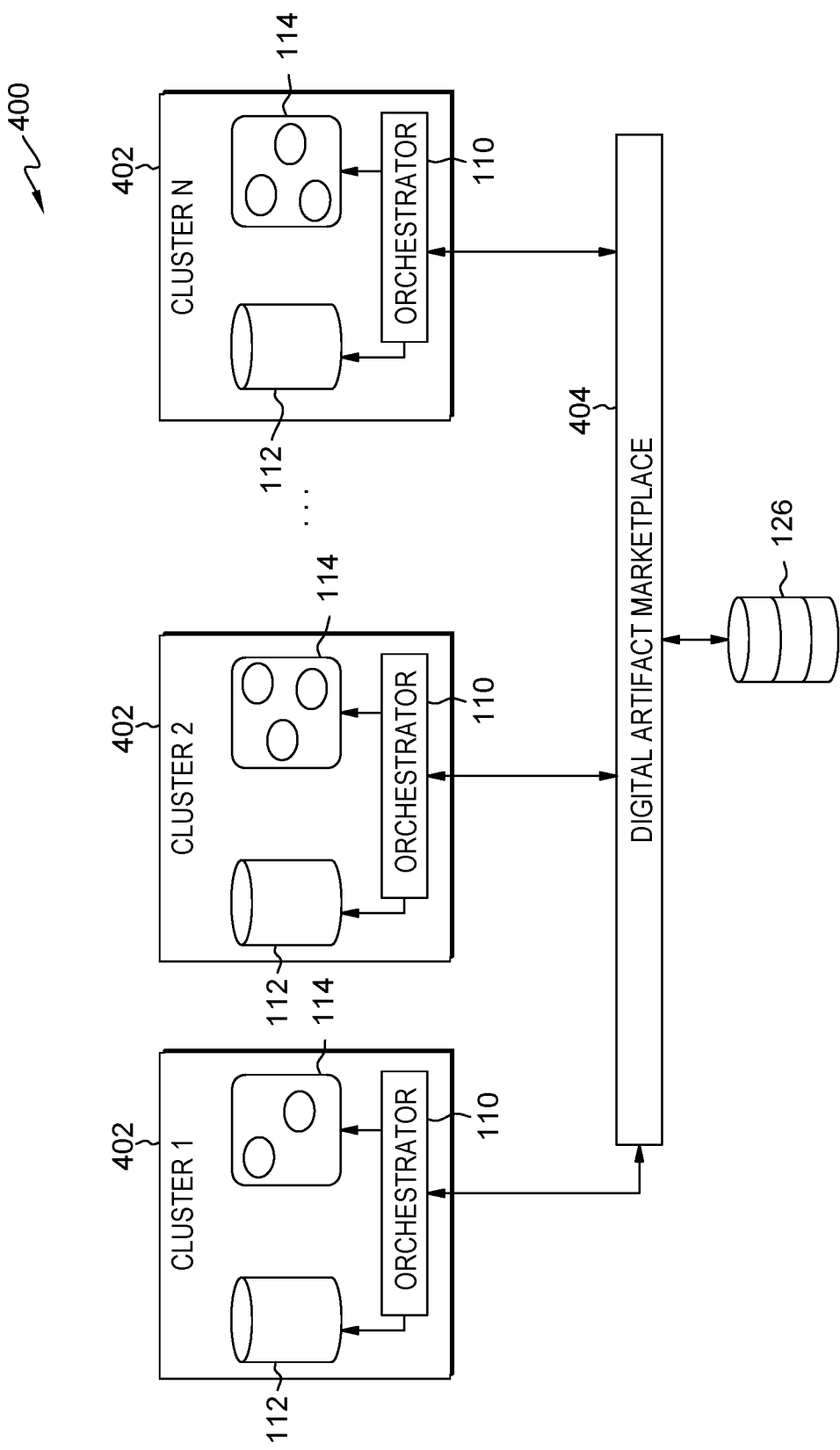
FIG. 4 illustrates another exemplary functional diagram of the marketplace engine within the digital marketplace platform of FIG. 1, in accordance with an embodiment of the present disclosure.

FIG. 4 illustrates another exemplary functional diagram of marketplace engine 120 in digital marketplace platform 102, in accordance with an embodiment of the present disclosure.

In the example of FIG. 4, each cluster 402 (e.g., client 104) may include local database 112, workflow instance(s) 114, and orchestrator 110. In an example, each cluster 402 may have one or more instances 114. Each cluster 402 may host one or more orchestrators 110. Each cluster 402 may host one or more local databases 112 which can be digital artifacts databases. In an example, orchestrator 110 may execute one or more workflow instances 114. Orchestrator 110 may store information about the workflows, including digital artifacts metadata to artifact catalogue database 126. Orchestrator 110 may get a digital artifact from digital artifact marketplace 404 (e.g., digital marketplace platform 102). Orchestrator 110 may store a digital artifact in local database 112. Orchestrator 110 may use a digital artifact to compose optimized workflow instances, or to optimize the execution of active workflow instances. Orchestrator 110 may push some of local digital artifacts to digital artifact marketplace 404. Orchestrator 110 may revoke a digital artifact that orchestrator 110 has submitted to digital artifact marketplace 404. Orchestrator 110 may query digital marketplace platform 102 for information about a digital artifact, including usage metadata and provenance metadata. In an example, artifact catalogue database 126 may include a catalogue of available digital artifacts. Artifact catalogue database 126 may act as a proxy to forward a request to an appropriate cluster digital artifact database (e.g., local database 112).

Figure 5:
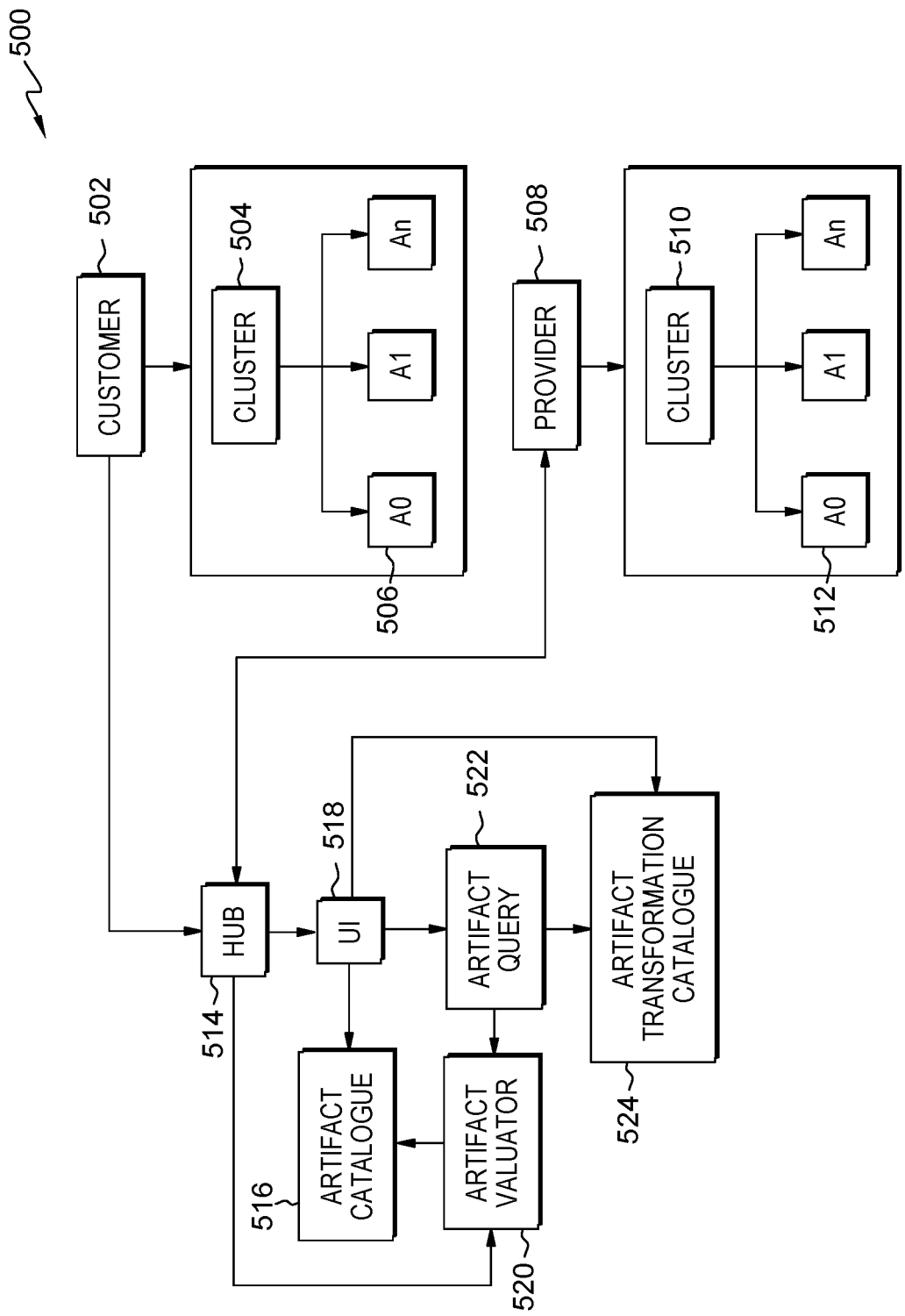
FIG. 5 illustrates another exemplary functional diagram of the marketplace engine within the digital marketplace platform of FIG. 1, in accordance with an embodiment of the present disclosure.

FIG. 5 illustrates another exemplary functional diagram of marketplace engine 120 in digital marketplace platform 102, in accordance with an embodiment of the present disclosure.

In the example of FIG. 5, customer 502 (e.g., client 104) may use one or more multiple clusters 504, each of which consumes multiple artifacts (A0, A1 . . . An) 506. Similarly, provider 508 may use one or more multiple clusters 510 to produce multiple artifacts (A0, A1 . . . An) 512. Each cluster 504, 510 may use one or more workflow execution engines to apply pre/post transformation steps whose instructions are stored in artifact transformation catalogue 524. Customer 502 can ask for an artifact. Customer 502 can open an auction to buy an artifact. Customer 502 can query digital marketplace platform 102 for metadata about a digital artifact. Customer 502 may query digital marketplace platform for metadata about provider 508. Customer 502 may query digital marketplace platform for metadata about customer 502. Customer 502 can view providers' 508 bids and may select one or more desired bids. Provider 508 can be asked to generate an artifact. Provide 508 may bid to customer's 502 request. Provider 508 may push an existing artifact to digital marketplace platform 102. Provider 508 may query digital marketplace platform 102 for metadata about a digital artifact. Provider 508 may query digital marketplace platform 102 for metadata about provider 508. Provider 508 may query digital marketplace platform 102 for metadata about customer 502. Digital marketplace platform 102 may include hub 514, which is an entry point or gateway for customer 502 and provider 508 to access digital marketplace platform 102. In the depicted embodiment, marketplace engine 120 includes hub 514, user interface 518, artifact query 522, artifact valuator 520, artifact catalogue 516, and artifact transformation catalogue 524.

Figure 6:
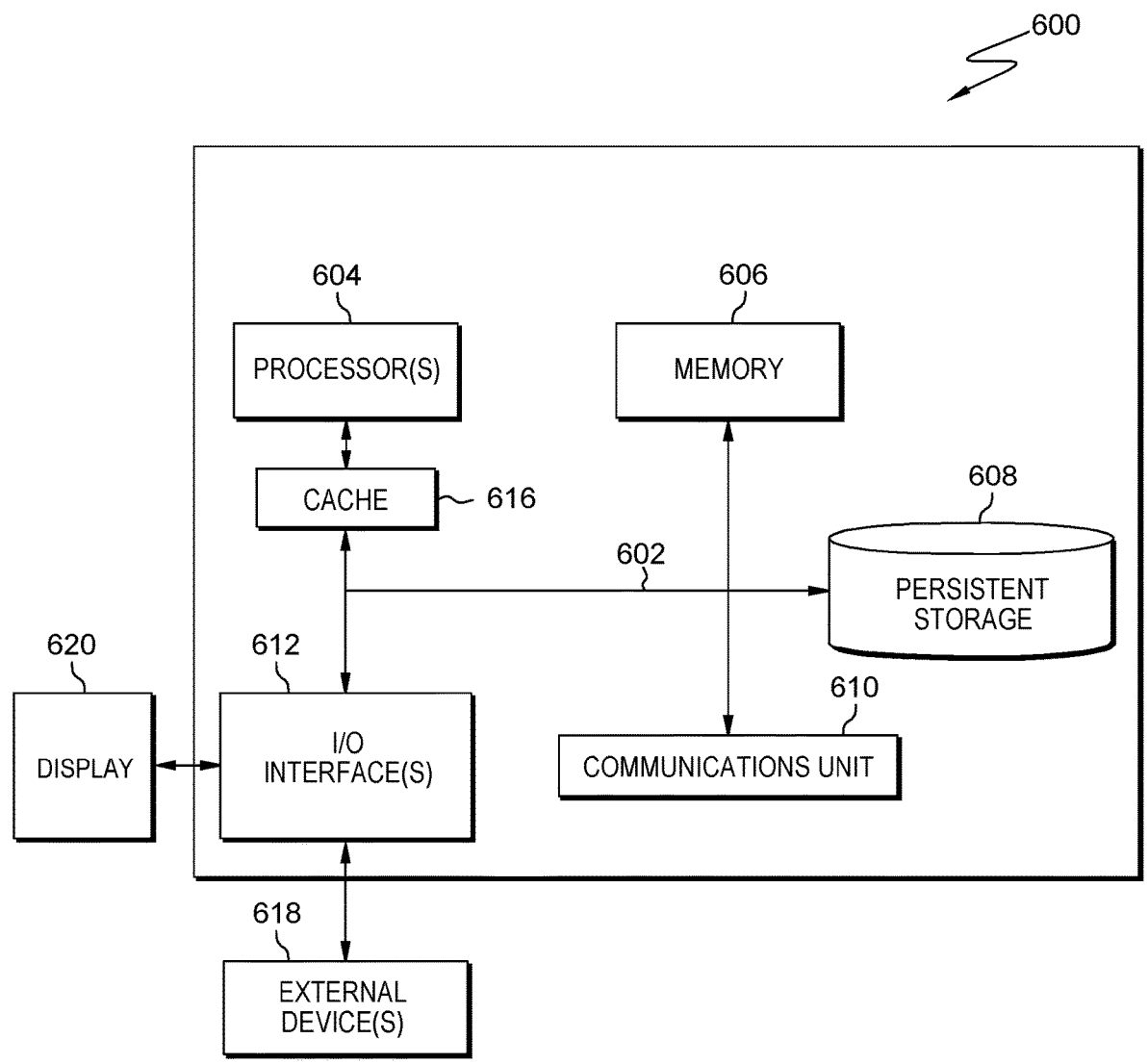
FIG. 6 is a block diagram of components of a digital marketplace platform of FIG. 1, in accordance with an embodiment of the present disclosure.

FIG. 6 depicts a block diagram 600 of components of digital marketplace platform 102 in accordance with an illustrative embodiment of the present disclosure. It should be appreciated that FIG. 6 provides only an illustration of one implementation and does not imply any limitations with regard to the environments in which different embodiments may be implemented. Many modifications to the depicted environment may be made.

Digital marketplace platform 102 may include communications fabric 602, which provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of computer processor(s) 604 by holding recently accessed data, and data near accessed data, from memory 606.

Marketplace engine 120 may be stored in persistent storage 608 and in memory 606 for execution by one or more of the respective computer processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Marketplace engine 120 may be downloaded to persistent storage 608 through communications unit 610.

I/O interface(s) 612 allows for input and output of data with other devices that may be connected to digital marketplace platform 102. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., marketplace engine 120 can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A computer-implemented method comprising:
    obtaining, by one or more processors, a digital artifact in a digital marketplace platform, wherein the digital artifact is a collection of digital data generated by an orchestrator hosted by a first client using a first workflow, and wherein the digital artifact is stored with automatically generated and verifiable provenance and usage data;
    transforming, by one or more processors, the digital artifact by annotating the digital artifact with data security metadata;
    sharing, by one or more processors, the digital artifact in the digital marketplace platform by providing a view of a catalogue including the digital artifact;
    authorizing, by one or more processors, a usage request from an orchestrator hosted by a second client based on the data security metadata and an access privilege of the second client;
    optimizing, by one or more processors and in response to the authorizing, a second workflow by reusing the digital artifact, wherein the second workflow is executed by the orchestrator hosted by the second client while accessing the digital artifact; and
    rewarding, by one or more processors, the first client based on the reusing.

2. The computer-implemented method of claim 1, wherein the digital artifact further comprises documents, data, and configuration parameters that are produced by a collection of workflows, workflow descriptions, and subgraphs of the workflows, and wherein the provenance and usage data comprises a record of a process selected from the group consisting of: originating the collection of digital data, transforming the collection of digital data, and submitting the digital artifact to the digital marketplace platform.

3. The computer-implemented method of claim 1, wherein the annotating defines the access privilege.

4. The computer-implemented method of claim 1, further comprising:
    uploading the digital artifact to the digital marketplace platform;
    cataloging the digital artifact into the catalogue;
    querying the digital artifact;
    querying the provenance and usage data;
    reusing the digital artifact by a workflow orchestrator to optimize execution of related pipelines and computational workflows; and
    downloading the digital artifact from the digital marketplace platform.

5. The computer-implemented method of claim 1, further comprising:
    evaluating a second usage request for the digital artifact; and
    in response to determining, based on the evaluating, that the second usage request fails to meet a pre-defined standard, rejecting the second usage request.

6. The computer-implemented method of claim 1, further comprising:
    tracking usage of the digital artifact;
    tracking provenance information of the digital artifact;
    determining a value of the digital artifact; and
    charging a user for using the digital artifact.

7. The computer-implemented method of claim 1, further comprising:
    rewarding the first client with a digital currency in response to the sharing the digital artifact in the digital marketplace platform; and
    rewarding the first client with the digital currency whenever the digital artifact is reused.

8. A computer program product comprising:
    one or more computer readable storage media, and program instructions collectively stored on the one or more computer readable storage media, the program instructions comprising:
    program instructions to obtain a digital artifact in a digital marketplace platform, wherein the digital artifact comprises a collection of digital data generated by an orchestrator hosted by a first client using a first workflow, and wherein the digital artifact is stored with automatically generated and verifiable provenance and usage data;
    program instructions to transform the digital artifact by annotating the digital artifact with data security metadata;
    program instructions to share the digital artifact in the digital marketplace platform by providing a view of a catalogue including the digital artifact;
    program instructions to authorize a usage request from an orchestrator hosted by a second client based on the data security metadata and an access privilege of the second client;
    program instructions to, in response to the authorization, optimize a second workflow by reusing the digital artifact, wherein the second workflow is executed by the orchestrator hosted by the second client while accessing the digital artifact; and
    program instructions to reward the first client based on the reusing.

9. The computer program product of claim 8, wherein the digital artifact further comprises documents, data, and configuration parameters that are produced by a-collection of workflows, workflow descriptions, and subgraphs of the workflows, and wherein the provenance and usage data comprises a record of a process selected from the group consisting of: originating the collection of digital data, transforming the collection of digital data, and submitting the digital artifact to the digital marketplace platform.

10. The computer program product of claim 8, wherein the annotating defines the access privilege.

11. The computer program product of claim 8, further comprising:
program instructions to upload the digital artifact to the digital marketplace platform;
program instructions to catalog the digital artifact into the catalogue;
program instructions to query the digital artifact;
program instructions to query the provenance and usage data;
program instructions to reuse the digital artifact by a workflow orchestrator to optimize execution of related pipelines and computational workflows; and
program instructions to download the digital artifact from the digital marketplace platform.

12. The computer program product of claim 8, further comprising:
program instructions to evaluate a second usage request for the digital artifact; and
program instructions to, in response to determining, based on the evaluation, that the second usage request fails to meet a pre-defined standard, reject the second usage request.

13. The computer program product of claim 8, further comprising:
program instructions to track usage of the digital artifact;
program instructions to track provenance information of the digital artifact;
program instructions to determine a value of the digital artifact; and
program instructions to charge a user for using the digital artifact.

14. The computer program product of claim 8, further comprising:
program instructions to reward the first client with a digital currency in response to the sharing the digital artifact in the digital marketplace platform;
program instructions to reward the first client with the digital currency whenever the digital artifact is reused.

15. A computer system comprising:
one or more computer processors, one or more computer readable storage media, and program instructions stored on the one or more computer readable storage media for execution by at least one of the one or more computer processors, the program instructions comprising:
program instructions to obtain a digital artifact in a digital marketplace platform, wherein the digital artifact comprises a collection of digital data generated by an orchestrator hosted by a first client using a first workflow, and wherein the digital artifact is stored with automatically generated and verifiable provenance and usage data;
program instructions to transform the digital artifact by annotating the digital artifact with data security metadata;
program instructions to share the digital artifact in the digital marketplace platform by providing a view of a catalogue including the digital artifact;
program instructions to authorize a usage request from an orchestrator hosted by a second client based on the data security metadata and an access privilege of the second client;
program instructions to, in response to the authorization, optimize a second workflow by reusing the digital artifact, wherein the second workflow is executed by the orchestrator hosted by the second client while accessing the digital artifact; and
program instructions to reward the first client based on the reusing.

16. The computer system of claim 15, wherein the digital artifact further comprises documents, data, and configuration parameters that are produced by a collection of workflows, workflow descriptions, and subgraphs of the workflows, and wherein the provenance and usage data comprises a record of a process selected from the group consisting of: originating the collection of digital data, transforming the collection of digital data, and submitting the digital artifact to the digital marketplace platform.

17. The computer system of claim 15, wherein the annotating defines the access privilege.

18. The computer system of claim 15, wherein the program instructions further comprise:
program instructions to upload the digital artifact to the digital marketplace platform;
program instructions to catalog the digital artifact into the catalogue;
program instructions to query the digital artifact;
program instructions to query the provenance and usage data regarding the digital artifact;
program instructions to reuse the digital artifact by a workflow orchestrator to optimize execution of related pipelines and computational workflows; and
program instructions to download the digital artifact from the digital marketplace platform.

19. The computer system of claim 15, wherein the program instructions further comprise:
program instructions to evaluate a second usage request for the digital artifact; and
program instructions to, in response to determining, based on the evaluation, that the second usage request fails to meet a pre-defined standard, reject the second usage request.

20. The computer system of claim 15, wherein the program instructions further comprise:
program instructions to track usage of the digital artifact;
program instructions to track provenance information of the digital artifact;
program instructions to determine a value of the digital artifact; and
program instructions to charge a user for using the digital artifact.

* * * * *